US008234444B2

(12) United States Patent
Bates et al.

(10) Patent No.: US 8,234,444 B2
(45) Date of Patent: Jul. 31, 2012

(54) APPARATUS AND METHOD TO SELECT A DEDUPLICATION PROTOCOL FOR A DATA STORAGE LIBRARY

(75) Inventors: Allen Keith Bates, Tucson, AZ (US); Nils Haustein, Soergenloch (DE); Craig Anthony Klein, Tucson, AZ (US); Ulf Troppens, Mainz (DE); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 12/046,315

(22) Filed: Mar. 11, 2008

(65) Prior Publication Data

US 2009/0235022 A1 Sep. 17, 2009

(51) Int. Cl.
*G06F 12/00* (2006.01)
(52) U.S. Cl. .................. 711/114; 707/664; 714/6.22
(58) Field of Classification Search .................. 711/114
See application file for complete search history.

(56) References Cited

U.S. PATENT DOCUMENTS

| | | | |
|---|---|---|---|
| 5,486,844 A | 1/1996 | Randall et al. | |
| 5,568,478 A | 10/1996 | van Loo, Jr. et al. | |
| 6,453,396 B1 | 9/2002 | Boone et al. | |
| 6,647,514 B1 | 11/2003 | Umberger | |
| 7,072,910 B2 * | 7/2006 | Kahn et al. | 707/639 |
| 7,185,032 B2 | 2/2007 | Rudoff | |
| 7,853,750 B2 * | 12/2010 | Stager | 711/112 |
| 2005/0154848 A1 | 7/2005 | Itoh et al. | |
| 2006/0143507 A1 | 6/2006 | Tanaka | |
| 2008/0005141 A1 | 1/2008 | Zheng | |

FOREIGN PATENT DOCUMENTS

| | | |
|---|---|---|
| JP | 2001043028 | 2/2001 |
| JP | 2001290746 | 10/2001 |
| JP | 2004295860 | 10/2004 |
| JP | 2006343924 | 12/2006 |

OTHER PUBLICATIONS

McCue D L et al, "Computing replica placement in distributed system", appeared in IEEE Second Workshop on Replicated Data, pp. 58-61, Monterey, Nov. 1992.
International Search Report and Written Opinion dated Jan. 12, 2010.

* cited by examiner

*Primary Examiner* — Matthew Bradley
*Assistant Examiner* — Kalpit Parikh
(74) *Attorney, Agent, or Firm* — Dale F. Regelman; Quarles & Brady LLP

(57) ABSTRACT

A method to select a deduplication protocol for a data storage library comprising a plurality of data storage devices configured as a RAID array, by establishing a normal deduplication protocol, a RAID failure deduplication protocol, and a multiple storage device failure deduplication protocol. The method receives host data comprising a plurality of interleaved data blocks. If the system is operating without any storage device failures, then the method processes the host data using the normal deduplication protocol. If the system is operating with a storage device failure, then the method processes the host data using the RAID failure deduplication protocol. If the system is operating with multiple storage device failures, then the method processes the host data using the multiple storage device failure deduplication protocol.

25 Claims, 6 Drawing Sheets

… (1)

APPARATUS AND METHOD TO SELECT A DEDUPLICATION PROTOCOL FOR A DATA STORAGE LIBRARY

FIELD OF THE INVENTION

This invention relates to an apparatus and method to select a deduplication protocol for a data storage library.

BACKGROUND OF THE INVENTION

Computing systems generate information. It is known in the art to store such information using a plurality of data storage media. In a redundant array of independent disks ("RAID") configuration, information is stored in arrays of data storage media to provide fault tolerance and improved data access performance. RAID combines physical data storage media into a single logical unit either by using special hardware or software.

In a RAID 3, 4, 5, or 6 array configuration a process known as "data striping" is used in combination with parity data, i.e. encoded redundant information. In RAID 6, both row stripes and diagonal stripes are used, and one set of parity is associated with each row stripe and another set of parity is associated with each diagonal stripe, for dual redundancy. In RAID 6, row parity may be concentrated in a single row parity storage media, and diagonal parity may be concentrated in a different single diagonal parity storage media, or row and diagonal parity may be distributed across all data storage media in the array. Each RAID stripe comprises a predetermined number of sequential logical block arrays.

By striping data and distributing the parity across all drives in the array, optimum performance is realized by minimizing constant access to a single drive. If a drive fails in a RAID 6 array configuration, data written to the failed drive can be rebuilt using the parity data on the remaining drives. If the array is configured with an online spare drive, the RAID rebuild begins automatically when a failed drive is detected. If the array is not configured with a spare drive, then the RAID rebuild begins after the failed drive is replaced.

To rebuild lost data, each lost stripe is read from the remaining drives in the array. The lost stripe is restored using exclusive-OR ("XOR") operations performed by a RAID controller XOR engine. After the XOR engine restores the lost stripe, that restored stripe is written to the replacement or online spare drive. For RAID levels 3, 4, and 5, the rebuilt process involves (N-1) reads from the operational drives in the array and a single write to the replacement or online spare drive. When a stripe is fully restored, the rebuild process proceeds to restore the next lost stripe. For a double failure under RAID level 6, both row and diagonal stripes are used to construct the drive data being rebuilt to two spare drives.

During the rebuild process, the array remains accessible to users. The RAID controller must allocate system resources to process both host I/O requests and process the RAID rebuild.

SUMMARY OF THE INVENTION

The invention comprises a method to select a deduplication protocol for a data storage library comprising a plurality of data storage devices configured as a RAID array. The method establishes a normal deduplication protocol, a RAID failure deduplication protocol, and a multiple storage device failure deduplication protocol. The method receives host data comprising a plurality of interleaved data blocks. If the system is operating without any storage device failures, then the method processes the host data using the normal deduplication protocol. If the system is operating with a storage device failure, then the method processes the host data using the RAID failure deduplication protocol. If the system is operating with multiple storage device failures, then the method processes the host data using the multiple storage device failure deduplication protocol.

In certain embodiments, the method dynamically sets a deduplication protocol. In these embodiments, the deduplication protocol is a function of a number of failed data storage devices, an actual RAID rebuild rate, a minimum RAID rebuild threshold, and a maximum RAID rebuild threshold.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
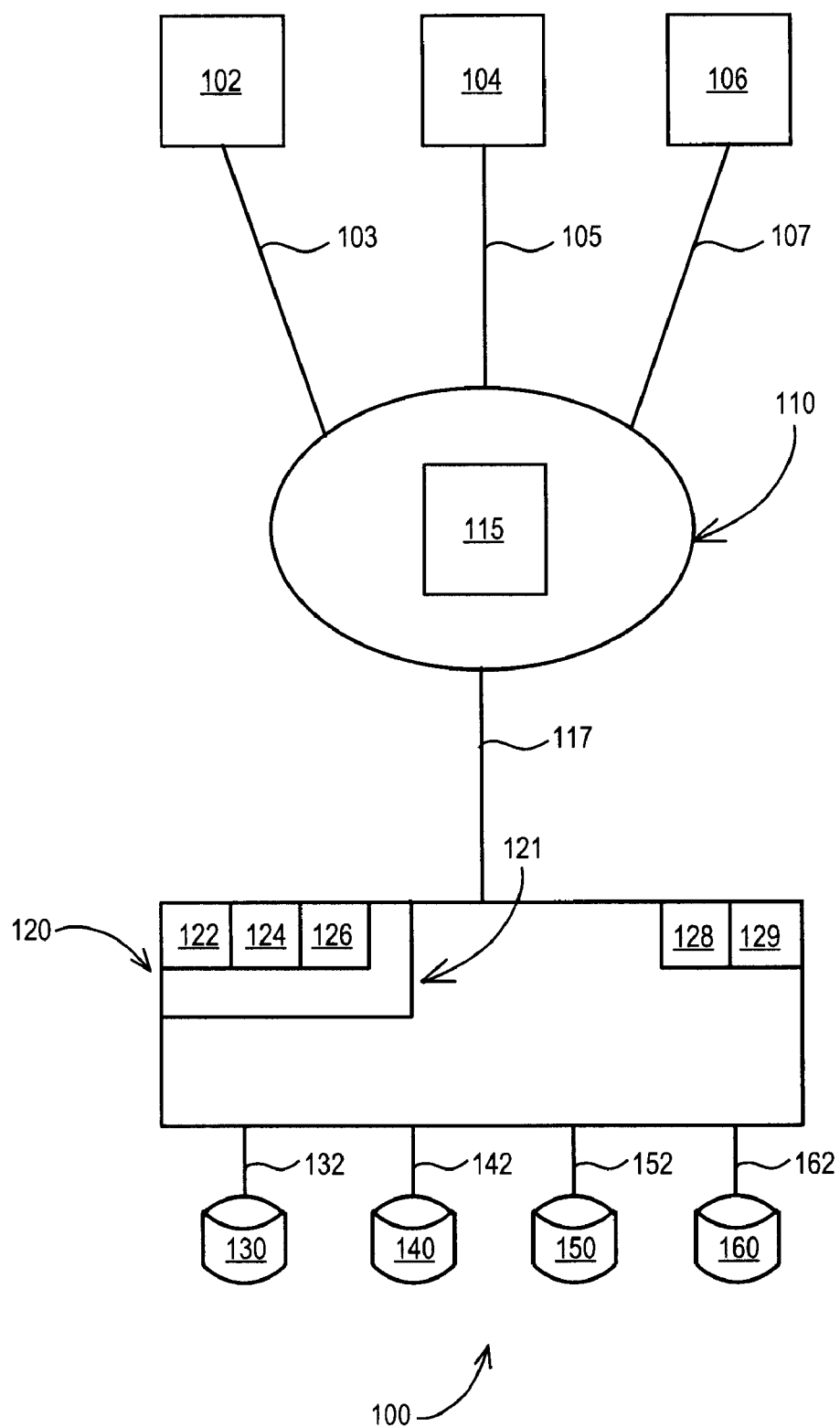
FIG. 1 is a block diagram showing one embodiment of Applicants' data storage system.

In the illustrated embodiment of FIG. 1, data processing system 100 comprises RAID controller 120 and data storage media 130, 140, 150, and 160. In the illustrated embodiment of FIG. 1, RAID controller 120 communicates with data storage media 130, 140, 150, and 160, via I/O protocols 132, 142, 152, and 162, respectively. I/O protocols 132, 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage media," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' RAID controller 120 is in communication with host computers 102, 104, and 106. As a general matter, hosts computers 102, 104, and 106, each comprises a computing system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 102, 104, and/or 106, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, Applicants' RAID controller 120 comprises processor 128, XOR engine 129, computer readable medium 121, microcode 122 written to computer readable medium 121, and instructions 124 written to computer readable medium 121. Processor 128 utilizes microcode 122 to operate RAID controller 120. In the illustrated embodiment of FIG. 1, Applicants' RAID controller 120 further comprises rebuild bitmap 126, wherein rebuild bitmap comprises (N) indicators, and wherein each indicator is associated with a different data stripe. If the (i)th indicator is set to a first value, then the associated data stripe has not been rebuilt, and wherein if the (i)th indicator is set to a second value, then the associated data stripe has been rebuilt, wherein (i) is less than or equal to 1 and greater than or equal to (N).

In addition to processing input/output ("I/O") operations related to data received from one or more host computers, such as for example and without limitation data deduplication, processor 128 also performs certain Background Operations such as for example and without limitation, checking and certifying parity, RAID rebuilds, and other "housekeeping" chores. In certain embodiments, processor 128 must allocate system resources, such as and with limitation, allocations of processor resources between data deduplication and a RAID rebuild.

In the illustrated embodiment of FIG. 1, host computers 102, 104, and 106, are connected to fabric 110 utilizing I/O protocols 103, 105, and 107, respectively. I/O protocols 103, 105, and 107, may be any type of IO protocol; for example, a Fibre Channel ("FC") loop, a direct attachment to fabric 110 or one or more signal lines used by host computers 102, 104, and 106, to transfer information to and from fabric 110.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computers 102, 104, and 106, to RAID controller 120 via I/O protocol 117. I/O protocol 117 may comprise any type of I/O interface, for example, a Fibre Channel, Infiniband, Gigabit Ethernet, Ethernet, TCP/IP, iSCSI, SCSI I/O interface or one or more signal lines used by FC switch 115 to transfer information through to and from RAID controller 120, and subsequently data storage media 30, 140, 150, and 160. In other embodiments, one or more host computers, such as for example and without limitation host computers 102, 104, and 106, communicate directly with RAID controller 120 using I/O protocols 103, 105, and 107, respectively.

Figure 2A:
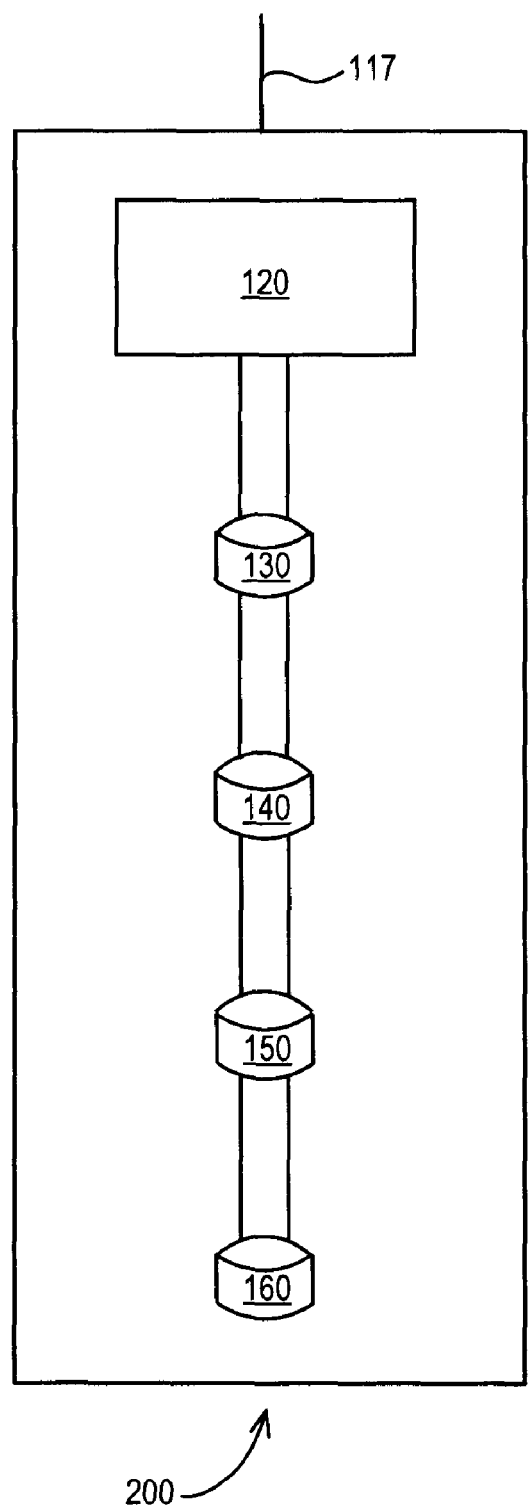
FIG. 2A is a block diagram showing one RAID controller in communication with a plurality of data storage media using a fibre channel arbitrated loop.

In the illustrated embodiment of FIG. 2A, Applicants' RAID controller 120 communicates with data storage media 130, 140, 150, and 160, using a fibre channel arbitrated ("FC-AL") loop of switches, wherein controller 120 and media 130, 140, 150, and 160, are disposed in information storage and retrieval system 200. As those skilled in the art will appreciate, information storage and retrieval system 200 further comprises additional elements, such as and without limitation one or more host adapters, one or more device adapters, a data cache, non-volatile storage, and the like. The illustrated embodiment of FIG. 2A should not be construed to limit Applicants' invention to use of fibre channel networks or devices. In other embodiments, other network topologies and devices are utilized, including without limitation SAS devices and/or SATA devices.

Figure 2B:
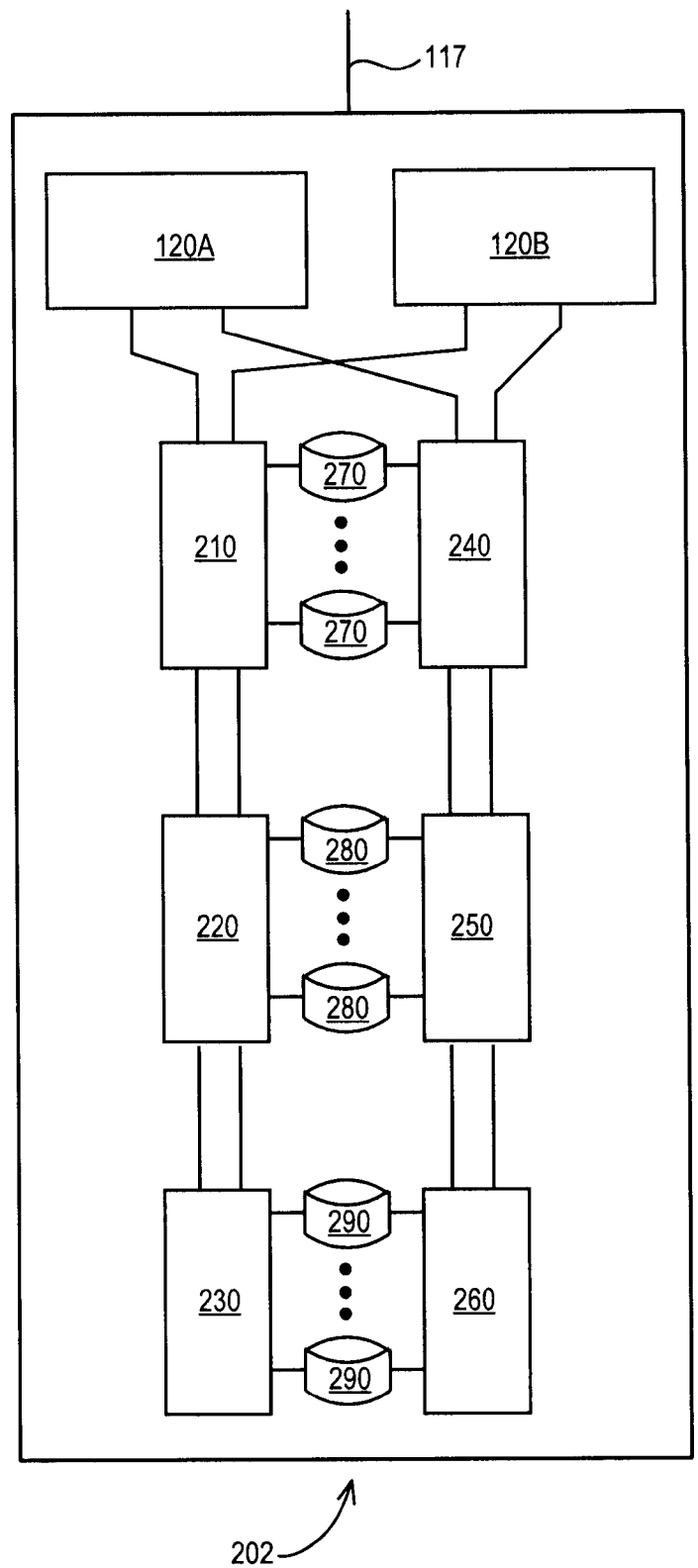
FIG. 2B is a block diagram showing two RAID controllers in communication with a plurality of data storage media using dual fibre channel arbitrated loops.

In the illustrated embodiment of FIG. 2B, Applicants' information storage and retrieval system 202 comprises dual FC-AL loops of switches wherein RAID controller 120A and RAID controller 120B are interconnected with both FC-AL loops. Each FC-AL loop contains one or more local controllers, such as local controllers 210, 220, 230, 240, 250, and 260. As those skilled in the art will appreciate, information storage and retrieval system 200 further comprises additional elements, such as and without limitation one or more host adapters, one or more device adapters, a data cache, non-volatile storage, and the like. In the illustrated embodiment of FIG. 2B, each RAID controller is in communication with a first plurality of data storage media 270, a second plurality of data storage media 280, and a third plurality of data storage media 290.

The illustrated embodiment of FIG. 2B should not be construed to limit Applicants' invention to use of fibre channel networks or devices. In the illustrated embodiment of FIG. 2B, the recitation of two FC-AL loops comprises one embodiment of Applicants' apparatus. In other embodiments, other network topologies and devices are utilized, including without limitation SAS devices and/or SATA devices.

As those skilled in the art will appreciate, data deduplication comprises a process to eliminate redundant data. In the deduplication process, duplicate data is deleted, leaving only one copy of the data to be stored. In certain embodiments, indexing of all data is still retained should that data ever be required. Deduplication is able to enhance the storage capability of a RAID array because only unique data is stored.

Data deduplication can generally operate at the file or the data block level. File level deduplication eliminates duplicate files, but this is not a very efficient means of deduplication. Block deduplication looks within a file and saves unique iterations of each block or bit. Each chunk of data is processed using a hash algorithm such as MD5 or SHA-1. This process generates a unique number for each piece which is then stored in an index.

If a file is updated, only the changed data is saved. That is, if only a few bytes of a document or presentation are changed, only the changed blocks or bytes are saved, the changes don't constitute an entirely new file. Therefore, block deduplication saves more storage space than file deduplication. However, block deduplication requires more processor resources.

Figure 3:
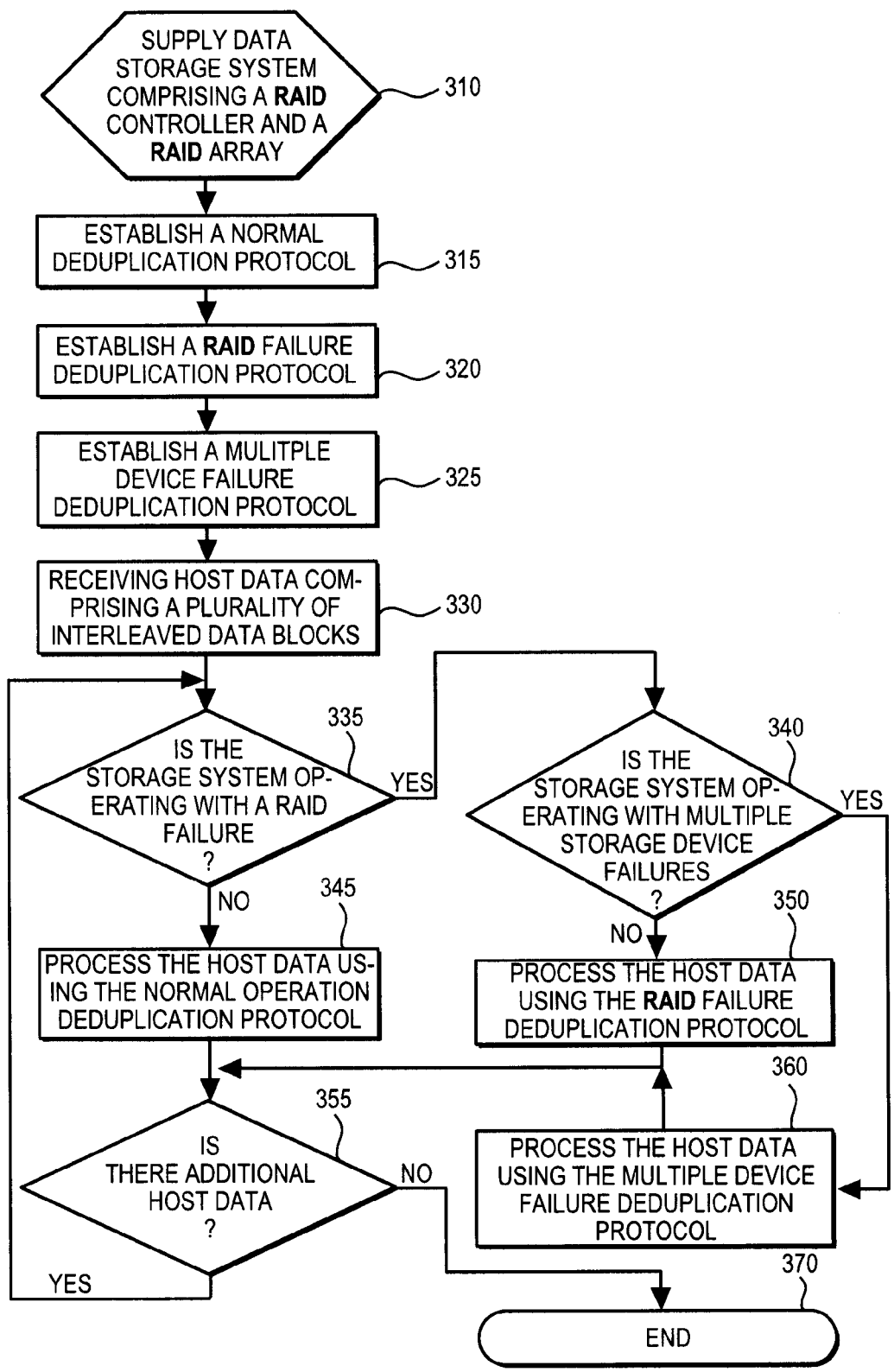
FIG. 3 is a flow chart summarizing certain steps in a first embodiment of Applicants' method.

During a RAID rebuild, Applicants' RAID controller allocates processing resources between the RAID rebuild and data deduplication. FIG. 3 summarizes Applicants' method to select a data deduplication protocol when simultaneously performing a RAID rebuild. Referring now to FIG. 3, in step 310 the method supplies a data storage system comprising a RAID controller and a RAID array.

In step 315, the method establishes a normal deduplication protocol. In certain embodiments, the normal deduplication protocol of step 315 deduplicates between about 90 percent to 100 percent of duplicative data blocks disposed in information received from one or more host computers. In certain embodiments, the normal deduplication protocol of step 320 deduplicates 100 percent of duplicative data blocks disposed in information received from one or more host computers.

In certain embodiments, a manufacturer of the data storage system of step 310 performs step 315. In certain embodiments, the owner and/or operator of the data storage system of step 310 performs step 315. In certain embodiments, a host computer interconnected with the data storage system of step 310 performs step 315.

In step 320, the method establishes a RAID failure deduplication protocol. By "RAID failure", Applicants mean a failure of one data storage device configured in a RAID array. In certain embodiments, the RAID failure deduplication protocol of step 320 deduplicates between about 40 percent to about 60 percent of duplicative data blocks disposed in information received from one or more host computers. In certain embodiments, the RAID failure deduplication protocol of step 320 deduplicates about 50 percent of duplicative data blocks disposed in information received from one or more host computers.

In certain embodiments, a manufacturer of the data storage system of step 310 performs step 320. In certain embodiments, the owner and/or operator of the data storage system of step 310 performs step 320. In certain embodiments, a host computer interconnected with the data storage system of step 310 performs step 320.

In step 325, the method establishes a multiple storage device failure deduplication protocol. In certain embodiments, the multiple storage device failure deduplication protocol of step 320 deduplicates between about 15 percent to about 35 percent of duplicative data blocks disposed in information received from one or more host computers. In certain embodiments, the multiple storage device failure deduplication protocol of step 325 deduplicates between about 25 percent of duplicative data blocks disposed in information received from one or more host computers.

In certain embodiments, a manufacturer of the data storage system of step 310 performs step 325. In certain embodiments, the owner and/or operator of the data storage system of step 310 performs step 325. In certain embodiments, a host computer interconnected with the data storage system of step 310 performs step 325.

In step 330, the method provides host data comprising a plurality of interleaved data blocks. In certain embodiments, the data of step 330 is received by a RAID controller. In certain embodiments, step 330 is performed by a host computer.

In step 335, the method determines if the data storage system of step 310 is operating with a RAID failure, i.e., whether a data storage device failure has been detected. In certain embodiments, step 335 is performed by a RAID controller. In certain embodiments, step 335 is performed by a host computer.

If the method determines in step 335 that the data storage system of step 310 is not operating with a RAID failure, then the method transitions from step 335 to step 345 wherein the method processes host data of step 330 using the normal deduplication protocol of step 315. In certain embodiments, step 345 is performed by a RAID controller. In certain embodiments, step 345 is performed by a host computer.

In step 355, the method determines if additional host data has been received. In certain embodiments, step 355 is performed by a RAID controller. In certain embodiments, step 355 is performed by a host computer.

If the method determines in step 355 that no additional host data has been received, then the method transitions from step 355 to step 370 and ends. Alternatively, if the method determines in step 355 that additional host data has been received, then the method transitions from step 355 to step 335 and continues as described herein.

If the method determines in step 335 that the data storage system of step 310 is operating with a RAID failure, then the method transitions from step 335 to step 340 wherein the method determines if the data storage system of step 310 is operating with multiple data storage device failures. In certain embodiments, step 340 is performed by a RAID controller. In certain embodiments, step 340 is performed by a host computer.

If the method determines in step 340 that the data storage system of step 310 is not operating with multiple data storage device failures, then the method transitions from step 340 to step 350 wherein the method processes the host data of step 330 using the RAID failure deduplication protocol of step 320. In certain embodiments, step 350 is performed by a RAID controller. In certain embodiments, step 350 is performed by a host computer. The method transitions from step 350 to step 355 and continues as described herein.

If the method determines in step 340 that the data storage system of step 310 is operating with multiple data storage device failures, then the method transitions from step 340 to step 360 wherein the method processes the host data of step 330 using the multiple device failure deduplication protocol of step 325. In certain embodiments, step 360 is performed by a RAID controller. In certain embodiments, step 360 is performed by a host computer. The method transitions from step 360 to step 355 and continues as described herein.

Figure 4:
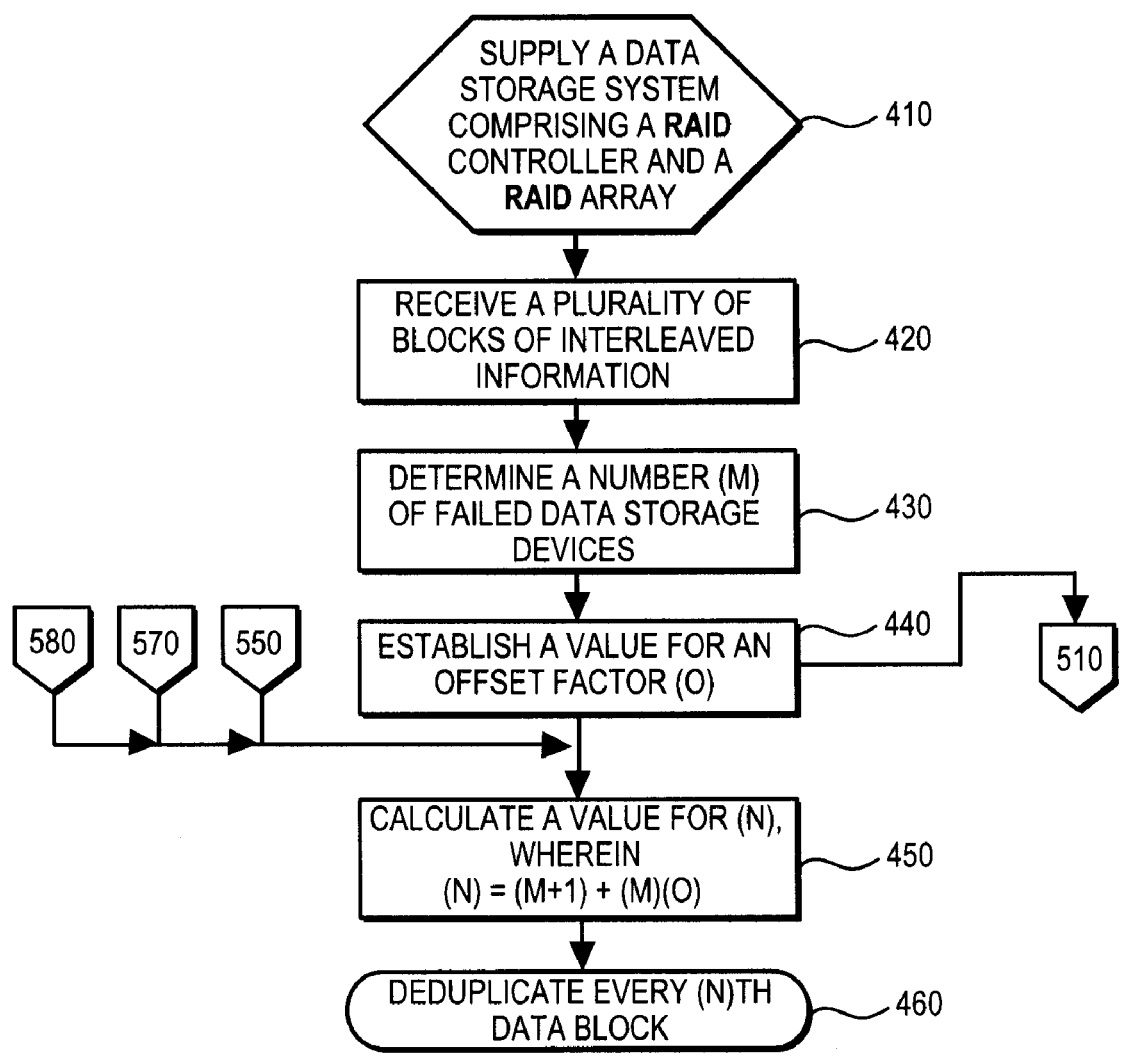
FIG. 4 is a flow chart summarizing certain steps in a second embodiment of Applicants' method.

In certain embodiments, Applicants' method FIG. 4 summarizes the steps of Applicants' method to dynamically set a deduplication protocol. Referring now to FIG. 4, in step 410 the method supplies a data storage system comprising a RAID controller and a RAID array.

In step 420, the method provides host data comprising a plurality of interleaved data blocks. In certain embodiments, the data of step 420 is received by a RAID controller. In certain embodiments, step 420 is performed by a host computer.

In step 430, the method determines a number (M) of failed data storage devices configured in the RAID array. In certain embodiments, step 430 is performed by a RAID controller. In certain embodiments, step 430 is performed by a host computer.

In step 440, the method establishes a value for an offset factor (O). In certain embodiments, O is greater than or equal to 0 and less than or equal to 2. In certain embodiments, O is greater than or equal to 0 and less than or equal to 3. In certain embodiments, O is greater than or equal to 0 and less than or equal to 4. In certain embodiments, step 440 is performed by a RAID controller. In certain embodiments, step 440 is performed by a host computer.

In step 450, the method calculates a value for (N), using Equation (i).

$$(N)=(M+1)+(M)(O)$$

In certain embodiments, step 450 is performed by a RAID controller. In certain embodiments, step 450 is performed by a host computer.

In step 460, the method deduplicates every (N)th duplicative data block identified in the host data of step 420. In certain embodiments, step 460 is performed by a RAID controller. In certain embodiments, step 460 is performed by a host computer.

The following examples are presented to further illustrate to persons skilled in the art how to make and use the method of FIG. 4. These examples are not intended as limitations, however, upon the scope of the invention.

EXAMPLE I

In the event the data storage system of step 410 is operating without any data storage device failure, then (N) is calculated to be 1 using Equation (i). In this example, the method deduplicates every duplicative data block identified in the host data of step 420.

EXAMPLE II

In the event the data storage system of step 410 is operating with 1 data storage device failure, and in the event (O) is set to 0, then (N) is calculated to be 2 using Equation (i). In this example, the method deduplicates 50 percent of the duplicative data block identified in the host data of step 420.

EXAMPLE III

In the event the data storage system of step 410 is operating with 1 data storage device failure, and in the event (O) is set to 1, then (N) is calculated to be 3 using Equation (i). In this example, the method deduplicates 33.3 percent of the duplicative data block identified in the host data of step 420.

Figure 5:
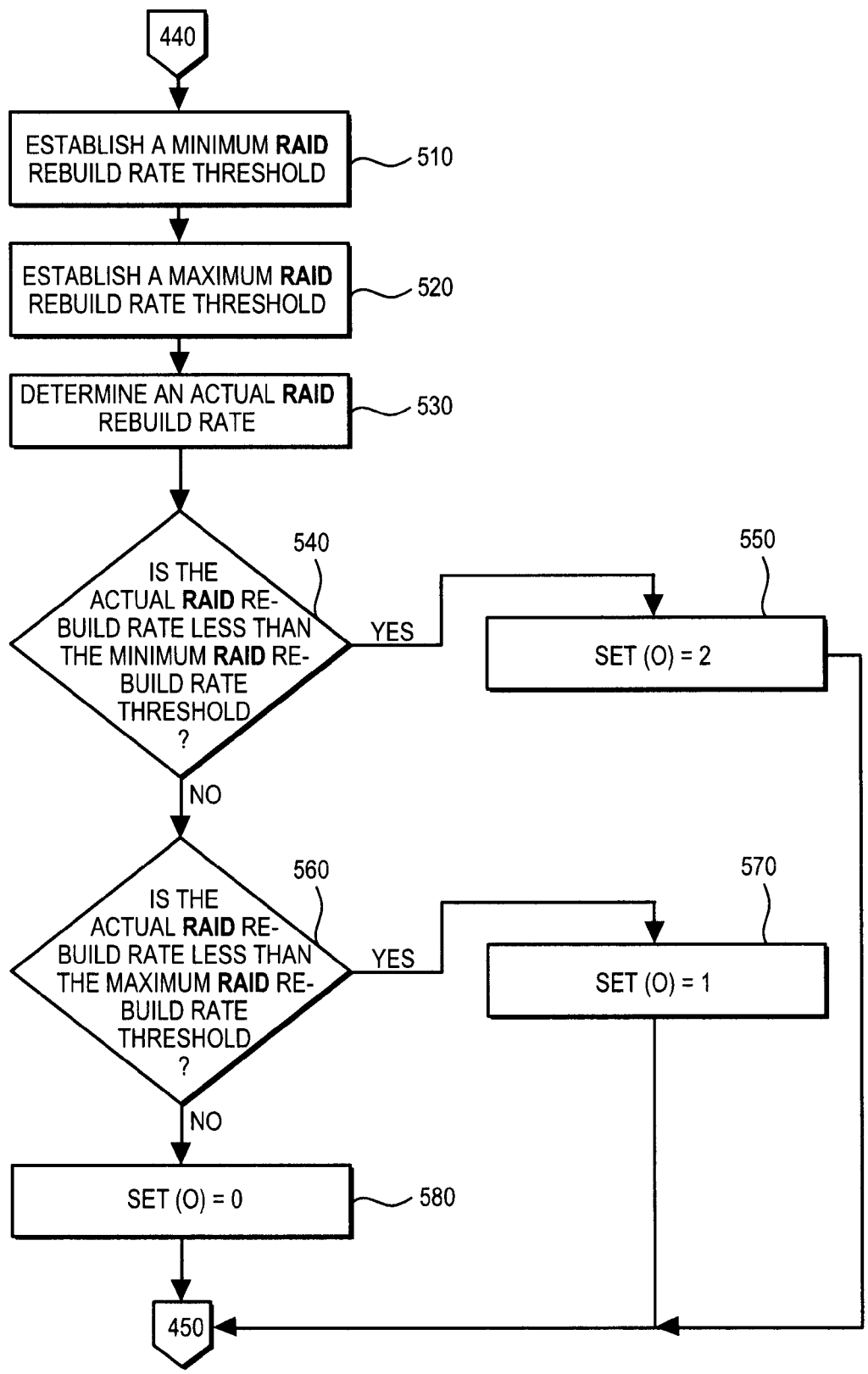
FIG. 5 is a flow chart summarizing certain additional steps in the second embodiment of Applicants' method.

In certain embodiments, step 440 recited in FIG. 4 comprises the steps recited in FIG. 5. Referring now to FIG. 5, in step 510, the method establishes a minimum RAID rebuild threshold. For example and without limitation, in certain embodiments the method sets in step 510 a minimum RAID rebuild rate of about 100 GB per hour. In certain embodiments, a manufacturer of the data storage system of step 410 performs step 510. In certain embodiments, the owner and/or operator of the data storage system of step 410 performs step 510. In certain embodiments, a host computer interconnected with the data storage system of step 410 performs step 510.

In step 520, the method establishes a maximum RAID rebuild threshold. For example and without limitation, in certain embodiments the method sets in step 520 a maximum RAID rebuild rate of about 200 GB per hour. In certain embodiments, a manufacturer of the data storage system of step 410 performs step 520. In certain embodiments, the owner and/or operator of the data storage system of step 410 performs step 520. In certain embodiments, a host computer interconnected with the data storage system of step 410 performs step 520.

In step 530, the method determines an actual RAID rebuild rate. In certain embodiments, step 530 is performed by a RAID controller. In certain embodiments, step 530 is performed by a host computer.

In step 540, the method determines if the actual RAID rebuild rate of step 530 is less than the minimum RAID rebuild rate threshold of step 510. In certain embodiments, step 540 is performed by a RAID controller. In certain embodiments, step 540 is performed by a host computer.

If the method determines in step 540 that the actual RAID rebuild rate of step 530 is less than the minimum RAID rebuild rate threshold of step 510, then the method transitions from step 540 to step 550 wherein the method sets the offset factor (O) to 2. In certain embodiments, step 550 is performed by a RAID controller. In certain embodiments, step 550 is performed by a host computer. The method transitions from step 550 to step 450 and continues as described herein.

If the method determines in step 540 that the actual RAID rebuild rate of step 530 is not less than the minimum RAID rebuild rate threshold of step 510, then the method transitions from step 540 to step 560 wherein the method determines if the actual RAID rebuild rate of step 530 is less than the maximum RAID rebuild rate threshold of step 520. In certain embodiments, step 560 is performed by a RAID controller. In certain embodiments, step 560 is performed by a host computer.

If the method determines in step 560 that the actual RAID rebuild rate of step 530 is less than the maximum RAID rebuild rate threshold of step 520, then the method transitions from step 560 to step 570 wherein the method sets the offset factor (O) to 1. In certain embodiments, step 570 is performed by a RAID controller. In certain embodiments, step 570 is performed by a host computer. The method transitions from step 570 to step 450 and continues as described herein.

Alternatively, if the method determines in step 560 that the actual RAID rebuild rate of step 550 is not less than the maximum RAID rebuild rate threshold of step 520, the method transitions from step 560 to step 580 wherein the method sets the offset factor (O) to 0. The method transitions from step 580 to step 450 and continues as described herein.

In certain embodiments, individual steps recited in FIGS. 3, 4, and 5, may be combined, eliminated, or reordered.

In certain embodiments, Applicants' invention includes instructions, such as instructions 124 (FIG. 1), residing in computer readable medium, such as for example computer readable medium 121 (FIG. 1) wherein those instructions are executed by a processor, such as processor 128 (FIG. 1), to perform one or more of steps 315, 320, 325, 330, 335, 340, 345, 350, 355, 360, and/or 370, recited in FIG. 3, and/or one or more of steps 420, 430, 440, 450, and/or 460, recited in FIG. 4, and/or one or more of steps 510, 520, 530, 540, 550, 560, 570, and/or 580, recited in FIG. 5.

In other embodiments, Applicants' invention includes instructions residing in any other computer program product, where those instructions are executed by a computer external to, or internal to, data storage systems 100 (FIG. 1) or 200 (FIG. 2A), or 202 (FIG. 2B), to perform one or more of steps 315, 320, 325, 330, 335, 340, 345, 350, 355, 360, and/or 370, recited in FIG. 3, and/or one or more of steps 420, 430, 440, 450, and/or 460, recited in FIG. 4, and/or one or more of steps 510, 520, 530, 540, 550, 560, 570, and/or 580, recited in FIG. 5. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to select a deduplication protocol for use in a data storage library comprising a plurality of data storage devices configured as a RAID array, comprising the steps of:
   establishing a normal deduplication protocol;
   establishing a RAID failure deduplication protocol;
   establishing a multiple storage device failure deduplication protocol;
   receiving host data comprising a plurality of interleaved data blocks;
   determining if said RAID array is operating with a RAID failure;
   operative if said RAID array is not operating with a RAID failure, processing said host data using said normal deduplication protocol.

2. The method of claim 1, wherein said normal deduplication protocol deduplicates between about 90 percent to about 100 percent of duplicative host data blocks.

3. The method of claim 1, further comprising the steps of:
   operative if said RAID array is operating with a RAID failure, determining if said RAID array is operating with multiple storage device failures;
   operative if said RAID array is operating with a RAID failure but not with multiple storage device failures, processing said host data using said RAID failure deduplication protocol.

4. The method of claim 3, wherein said RAID failure operation protocol deduplicates between about 40 percent to about 60 percent of duplicative host data blocks.

5. The method of claim 3, further comprising the step of processing said host data using said multiple storage device failure deduplication protocol if said RAID array is operating with multiple storage device failures.

6. The method of claim 5, wherein said multiple storage device failure operation protocol deduplicates between about 15 percent to about 35 percent of duplicative host data blocks.

7. A method to establish a data deduplication protocol for use in a data storage library comprising a plurality of data storage devices configured as a RAID array, comprising the steps of:
   receiving a plurality of blocks of interleaved information;
   determining a number (M) of failed data storage devices;
   establishing a value for an offset factor (O);
   calculating a value for (N), wherein (N)=(M+1)+(M)(O)
   deduplicating every (N)th data block.

8. The method of claim 7, further comprising the step of setting (O) equal to 0 when (M) equals 0.

9. The method of claim 7, further comprising the step of setting (O) equal to 1 when (M) equals 1.

10. The method of claim 7, further comprising the step of setting (O) equal to 2 when (M) equals 2.

11. The method of claim 7, further comprising the steps of:
   establishing a minimum RAID rebuild rate threshold;
   establishing a maximum RAID rebuild threshold;
   determining an actual RAID rebuild rate;
   determining if said actual RAID rebuild rate is less than said minimum RAID rebuild rate threshold;
   operative if said actual RAID rebuild rate is less than said minimum RAID rebuild rate threshold, setting (O) equal to 2.

12. The method of claim 11, further comprising the steps of:
   operative if said actual RAID rebuild rate is not less than said minimum RAID rebuild rate threshold, determining if said actual RAID rebuild rate is less than said maximum RAID rebuild rate;
   operative if said actual RAID rebuild rate is not less than said minimum RAID rebuild rate threshold and less than said maximum RAID rebuild rate, setting (O) equal to 1.

13. The method of claim 12, further comprising the step of setting (O) equal to 0 if said actual RAID rebuild rate is not less than said maximum RAID rebuild rate.

14. A RAID controller comprising a processor and a non-transitory computer readable medium, a normal deduplication protocol encoded in said computer readable medium, a RAID failure deduplication protocol encoded in said computer readable medium, a multiple storage device failure deduplication protocol encoded in said computer readable medium, and computer readable program code encoded in said computer readable medium, said program readable code being useable with said processor to allocate deduplication resources in a data storage library comprising a plurality of data storage devices configured as a RAID array, the computer readable program code comprising a series of computer readable program steps to effect:
   receiving host data comprising a plurality of interleaved data blocks;
   determining if said RAID array is operating with a RAID failure;
   operative if said RAID array is not operating with a RAID failure, processing said host data using said normal deduplication protocol.

15. The RAID controller of claim 14, wherein said computer readable program code to process said host data using said normal deduplication protocol further comprises a series of computer readable program steps to effect deduplicating between about 90 percent to about 100 percent of duplicative host data blocks.

16. The RAID controller of claim 14, said computer readable program code further comprising a series of computer readable program steps to effect:
   operative if said RAID array is operating with a RAID failure, determining if said RAID array is operating with multiple storage device failures;
   operative if said RAID array is operating with a RAID failure but not with multiple storage device failures, processing said host data using said RAID failure deduplication protocol.

17. The RAID controller of claim 16, wherein said computer readable program code to process said host data using said RAID failure deduplication protocol further comprises a series of computer readable program steps to effect deduplicating between about 40 percent to about 60 percent of duplicative host data blocks.

18. The RAID controller of claim 17, said computer readable program code further comprising a series of computer readable program steps to effect processing said host data using said multiple storage device failure deduplication protocol if said RAID array is operating with multiple storage device failures.

19. The RAID controller of claim 18, wherein said computer readable program code to process said host data using said RAID failure deduplication protocol further comprises a series of computer readable program steps to effect deduplicating between about 15 percent to about 35 percent of duplicative host data blocks.

20. A RAID controller comprising a processor, a non-transitory computer readable medium, and computer readable program code encoded in said computer readable medium, said program readable code being useable with said processor to allocate deduplication resources in a data storage library comprising a plurality of data storage devices configured as a RAID array, the computer readable program code comprising a series of computer readable program steps to effect:
  receiving a plurality of blocks of interleaved information;
  determining a number (M) of failed data storage devices;
  establishing a value for an offset factor (O);
  determining a number (N) using a formula N=(M+1)+(M)(O) deduplicating every (N)th data block.

21. The RAID controller of claim 20, said computer readable program code further comprising a series of computer readable program steps to effect setting (O) equal to 0 when (M) equals 0.

22. The RAID controller of claim 21, said computer readable program code further comprising a series of computer readable program steps to effect setting (O) equal to 1 when (M) equals 1.

23. The RAID controller of claim 20, further comprising said computer readable program code further comprising a minimum RAID rebuild rate threshold encoded in said computer readable medium and a maximum RAID rebuild threshold encoded in said computer readable medium, said computer readable program code further comprising a series of computer readable program steps to effect:
  determining an actual RAID rebuild rate;
  determining if said actual RAID rebuild rate is less than said minimum RAID rebuild rate threshold;
  operative if said actual RAID rebuild rate is less than said minimum RAID rebuild rate threshold, setting (O) equal to 2.

24. The RAID controller of claim 23, said computer readable program code further comprising a series of computer readable program steps to effect:
  operative if said actual RAID rebuild rate is not less than said minimum RAID rebuild rate threshold, determining if said actual RAID rebuild rate is less than said maximum RAID rebuild rate;
  operative if said actual RAID rebuild rate is not less than said minimum RAID rebuild rate threshold and less than said maximum RAID rebuild rate, setting (O) equal to 1.

25. The RAID controller of claim 24, said computer readable program code further comprising a series of computer readable program steps to effect setting (O) equal to 0 if said actual RAID rebuild rate is not less than said maximum RAID rebuild rate.

* * * * *